United States Patent [19]

Goudey

[11] 4,320,920
[45] Mar. 23, 1982

[54] AIR DEFLECTOR DUCT

[76] Inventor: Robert B. Goudey, 3 Selwyn Crescent, Kanata, Ontario K2K 1N7, Canada

[21] Appl. No.: 148,266

[22] Filed: May 9, 1980

[51] Int. Cl.³ ............................................. B62D 35/00
[52] U.S. Cl. ........................................ 296/1 S; 296/91
[58] Field of Search .................................. 296/1 S, 91

[56] References Cited

U.S. PATENT DOCUMENTS

| | | | |
|---|---|---|---|
| 3,010,754 | 11/1961 | Shumaker | 296/1 S |
| 3,072,434 | 1/1963 | Shumaker | 296/1 S |
| 3,214,215 | 10/1965 | Hansen | 296/91 |
| 3,276,811 | 10/1966 | Schmidt | 296/1 S |
| 3,743,343 | 7/1973 | Grote | 296/1 S |
| 3,807,787 | 4/1974 | Gotz | 296/1 S |
| 3,934,922 | 1/1976 | MacCready | 296/1 S |
| 3,960,402 | 6/1976 | Keck | 296/1 S |
| 3,999,797 | 12/1976 | Kirsch | 296/1 S |

FOREIGN PATENT DOCUMENTS 625920 8/1961 Canada .
630338 11/1961 Canada .

Primary Examiner—Robert R. Song
Attorney, Agent, or Firm—Burns, Doane, Swecker & Mathis

[57] ABSTRACT

An air deflector for reducing turbulence and drag at the rear area of vehicles consists of an elongated, cellular structure having inner and outer plates spaced apart by a plurality of deflector ribs. The deflector can be shaped to the contour of a specific vehicle configuration or can be provided in detachable form.

4 Claims, 8 Drawing Figures

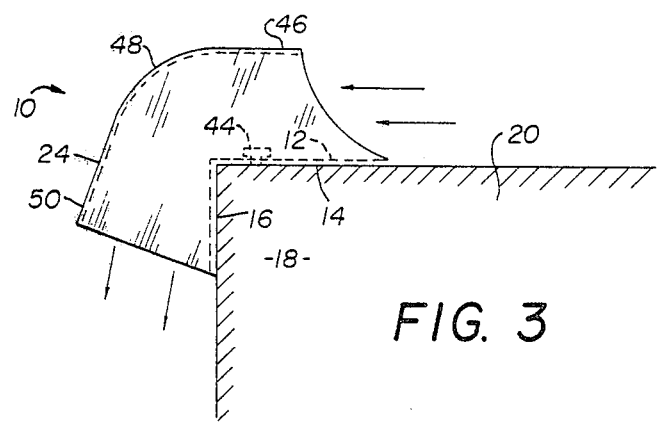
FIG. 3
FIG. 4
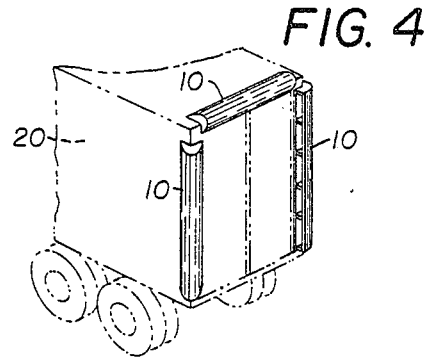
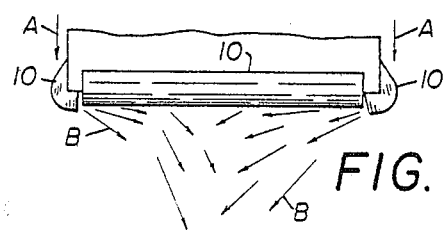
FIG. 5

AIR DEFLECTOR DUCT

FIELD OF THE INVENTION

This invention relates to air deflectors for vehicles and in particular to deflectors for mounting on or adjacent the rear corners of vehicles having a flat or relatively flat rear surface such as trailer bodies, buses, vans, travel trailers and some automobiles.

BACKGROUND OF THE INVENTION

With recent spiralling costs in fuel and a general movement toward fuel conservation, vehicle design has evolved to box-like configurations whether the vehicle is a small car, bus, or transport trailer. Box-like designs provide for maximum usage of space within the vehicle but, to their detriment, they do little in the way of providing streamlining for the vehicle and, the larger the vehicle becomes, the more detrimental the design is from the point of view of efficiently moving the vehicle through the air, particularly at highway speeds. Streamlining a vehicle by modifying its contours is expensive and impractical especially for large commercial vehicles.

Large, flat backed vehicles such as tractor trailer combinations and buses create a low pressure region adjacent its rearward surface during forward motion of the vehicle and this low pressure region in turn creates drag resulting in a higher consumption of fuel. In an effort to reduce this low pressure area and the resulting drag, numerous proposals have been made to provide some form of deflecting device for directing air flowing past the sides and top of the vehicles into the low pressure region to thereby reduce the effect of drag and consequently produce increased fuel efficiency for such large vehicles. However, the presently obtainable devices have not proven very satisfactory, the absence of any widespread use of deflecting devices being witness to this fact. The inherent disadvantages with conventional deflectors is that they are normally fabricated from numerous parts and for the large trailer operator, conventional devices have been unsuccessful due to the fact that they are easily broken or damaged when the trailer vehicle is backed into a loading dock or when the large swing doors are opened and pivoted 180 or more degrees to unload the contents.

Cab mounted deflectors have been in use for some time but while these reduce the amount of air that the front end of the trailer body has to contend with, they do little or nothing for the low pressure area at the back of the vehicle.

SUMMARY OF THE INVENTION

The present invention provides solutions to the disadvantages of the prior art mentioned above in an air deflector duct which can be fixed to the rear corner of the vehicles mentioned above or demountably secured thereto, the duct being designed to redirect air flowing down the sides and the top as well of the box-like vehicles and to redirect that air into the area of turbulence behind the vehicle, thereby substantially reducing the amount of drag that the vehicle creates at highway speeds and providing a noticeable increase in fuel economy. The duct is a rigidly constructed member formed either in one piece or by interconnected modular units which may be mounted permanently on the rear corners of vehicles such as vans, buses, house trailers and the like or which can be detachably secured to the rear corners of trailer bodies and in this way can be quickly removed by the trailer operator before the doors are opened or before the rig is backed into a loading dock. Preferably, the ducts extend the full length or substantially the full length of the rearward corners of the vehicle and, if space is available, a duct unit can extend across the roof at the rear edge thereof as well as the corners.

The duct may be used in modular sections to some advantage in large commercial trailers where the rough nature of such use can be taken into account so that a new modular section could be installed without replacing the entire air deflector duct if such a section should become damaged.

An additional benefit produced by the use of the air deflector duct according to the invention is the reduction of turbulence and buffeting on vehicles passing a large square-bodied vehicle such as a truck or bus which uses the present invention. Depending upon the direction of wind pressure, it often happens that passenger cars are caused to lurch or lose direction momentarily when being passed by a large truck. This is caused to some extent by the low pressure region behind the large moving vehicle, the turbulence being caused by air rushing from numerous directions to fill the vacuum.

The air deflector duct of the present invention may be formed from suitable materials such as aluminium or a strong form of plastic providing the material is of sufficient strength and stiffness to maintain its configuration when subjected to the dynamic loads applied to it from wind pressure during movement of the vehicle at highway speeds. Due to its simplified construction, the present invention can be relatively inexpensive to produce when compared to the devices of the prior art. There are no moving or adjustable parts which can be subjected to damaging vibrations and, due to its single unit construction, it can be produced in various lengths, possible in extruded form, to suit various vehicle heights and widths.

According to a broad aspect, the present invention relates to an air deflector duct for application to the rear corners of a vehicle, the duct comprising elongated inner and outer plates with deflector ribs interconnecting and spacing the inner and outer plates apart. The inner plates are shaped to generally conform to the contour of rear corner of the vehicle to which the duct is attached and the outer plate has a curved portion to direct air rearwardly and inwardly of the vehicle corner.

BRIEF DESCRIPTION OF THE DRAWINGS

The invention is illustrated by way of example in the accompanying drawings in which:

FIG. 3 is a schematic, plan view of the duct applied to a corner of a vehicle;

FIG. 4 is a perspective view, partly in phantom line, of several ducts of the present invention being applied to a truck body;

FIG. 5 is a plan view of a portion of FIG. 4;

Referring to FIG. 1, the air deflector duct generally indicated at 10 consists of an inner plate 12 having surfaces 14 and 16 at right angles to one another so that the duct 10 can closely fit a right-angle corner 18 of a vehicle body 20 as shown in FIG. 3. If the vehicle body is a large trailer having hinges or other protuberances along the corner edge, suitable openings such as 22 can be provided in the formation of the inner plate 12 as shown in FIG. 1. The duct 10 also includes an outer plate 24 interconnected with the inner plate 12 by means of a plurality of deflector ribs 26 spaced throughout the length of the duct unit as shown in FIG. 1. While the deflector ribs 26 are illustrated in FIG. 1 as being at right angles to the inner and outer plates 12 and 24, it will be appreciated that these ribs can be secured in any desired orientation for directing the air to specific locations behind the vehicle and such direction can be provided by a predetermined positioning where the rib can be welded or otherwise secured to the inner and outer plates or a suitable means of pivotal mounting to either the leading or trailing portions 28 or 30 of the rib can be provided.

The assembly of the inner and outer plates and the interconnection thereof by the deflector ribs 26 provides a very rigid and strong, cellular unit. As shown in FIG. 2, the unit 10 can be made up from a plurality of smaller, modular duct units 32 each of which would have an inner plate 34, and outer plate 36 and at least one interconnecting deflector rib 38. Each subunit 32 could be interconnected to an adjacent unit by various forms of attachment such as pin and socket, bolts or the like. Such a unit could advantageously be utilized in modular form in the application of the invention to the rear corners of tractor trailer bodies as such modular units are susceptible to damage from close fitting quarters during loading and the like, and can readily be replaced without replacing the whole duct.

Figure 1:
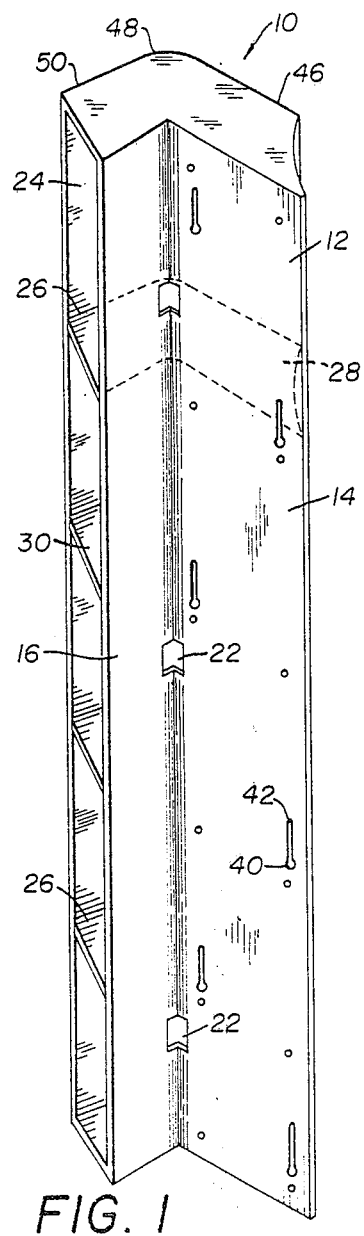
FIG. 1 is a perspective view of an air deflector duct according to the present invention.
Figure 2:
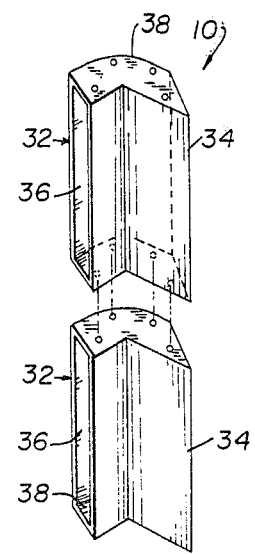
FIG. 2 is a similar view to FIG. 1 of a duct in modified form.

The majority of large trailers have rear opening doors which open up to 270 degrees so that the doors can be fastened in the open position against the sides of the truck or trailer when the vehicles have to operate in very restricted spaces such as warehouses and loading docks or when backing a truck unit down a narrow alleyway or the like. Accordingly, provision is made in the duct of the present invention for a quickly detachable form of connection to the vehicle body and one suggested form of such detachability is illustrated in FIG. 1 where the surface 14 of the inner plate 12 is provided with a series of apertures 40 and an adjacent, elongated narrow slideway 42. The unit is placed against the corner of a vehicle so that a series of bolts 44 (FIG. 3) have their heads received in the correspondingly spaced apertures 40 and the unit can then be dropped downwardly so that the heads of the bolts receive the unit 10 along the slideways 42 to provide a quickly detachable, slip-lock arrangement. Removal of the complete unit or modular sections such as in FIG. 2 is quickly carried out by raising the unit 10 so that the bolt heads 44 and the apertures 40 are coincident with one another and the unit can be removed. With such a feature, a trailer truck operator having the arrangement such as that shown in FIG. 4 where a plurality of ducts are secured to the truck 20, the operator can quickly lift and remove the side corner ducts 10 and open the trailer doors and lock them against the side of the vehicle, repositioning and attaching the ducts after the doors are reclosed.

FIG. 5 shows the general pattern of air taken by the duct 10 and redirected thereby. Air currents A passing down the side of the vehicle are redirected by the ducts 10 into the rear, low pressure area behind the trailer body as indicated by the arrows B. In order to attain this direction, it will be seen from FIGS. 1 and 2 that the outer plate 24 has a leading edge 46 spaced outwardly and slightly forwardly of the rear corner edge 18 of the trailer body and is generally parallel with the leading edge of the surface 14 of the inner plate 12. Progressing rearwardly, the leading edge 46 blends into a gently curving portion 48 and then into a trailing portion 50 which is preferably positioned between 90 and 120 degrees from a leading edge 46 when measured between the inner surfaces of the outer plate 24.

It will be appreciated that for vehicles having rounded corners such as vans, buses and the like the contour of the inner plate 12 will be fabricated accordingly.

Figure 6:
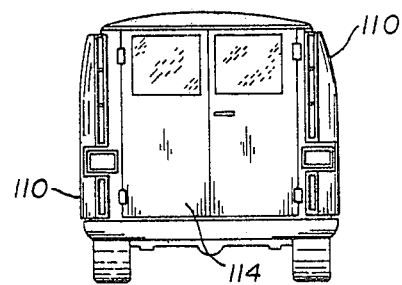
FIG. 6 is a rear view of a van employing the present invention.
Figure 7:
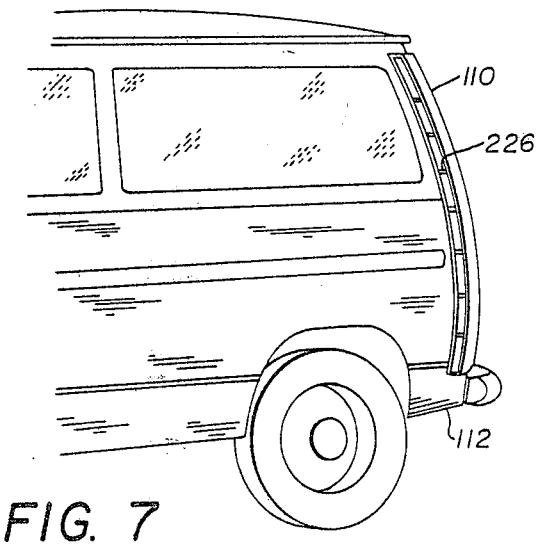
FIG. 7 is a perspective view of a corner of the van shown in FIG. 6.
Figure 8:
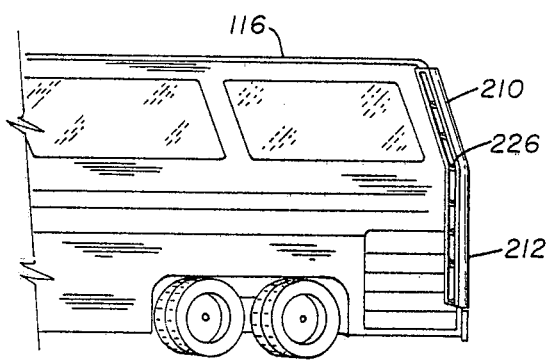
FIG. 8 is a similar view of a duct applied to a rear corner of a bus body.

An example of the present invention being applied to a van is shown in FIGS. 6 and 7 where the ducts 110 are shaped to the contour of the van corner 112 and are so arranged to provide sufficient room for opening of the van doors 114. Similarly, when the unit is to be applied to a vehicle such as a bus 116 in FIG. 8, the duct unit 210 can be fabricated to custom fit the rear corner of the vehicle and if necessary can include a removable portion 212 where maintenance panels or the like have to be removed from time to time. It will be noted from FIGS. 7 and 8 that the interior deflector ribs 226 in these custom installations can be angled to suit the desired direction to be applied to the deflected air currents.

While the invention has been described in connection with specific embodiments thereof and in specific uses, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

I claim:

1. An air deflector for application to the rear corners of a vehicle such as a transport trailer, bus, van or the like comprising elongated inner and outer plates and deflector ribs interconnecting and spacing said inner and outer plates apart; said inner plate being shaped to generally conform to the contour of a rear corner of said vehicle and said outer plate having a curved portion to direct air rearwardly and inwardly of said vehicle corner; and means on the inner plate of the deflector for releasably securing the deflector on the rear corner of a vehicle with the inner plate in face-to-face contact with at least one outer surface of the vehicle corner.

2. An air deflector according to claim 1 wherein the connecting ribs divide the deflector into a plurality of cells, said deflector being formed in a one-piece, integral construction.

3. An air deflector according to claim 1 formed of modular units each including an inner plate member, an outer plate member and at least one spacing rib member.

4. An air deflector according to claim 1 wherein said securing means comprises elongated apertures in one surface of the inner plate of said deflector, said apertures being adapted to cooperate with bolt heads on the juxtaposed vehicle surface to provide a vertical slip-on, slip-off arrangement.

* * * * *